United States Patent [19]

Comerford et al.

[11] Patent Number: 4,527,048
[45] Date of Patent: Jul. 2, 1985

[54] MULTI-PIECE CLAMPING SHELL FOR ELECTRIC CIGAR LIGHTERS

[75] Inventors: John J. Comerford, Stamford; Peter J. Lupoli, Hamden, both of Conn.

[73] Assignee: Sun Chemical Corporation, New York, N.Y.

[21] Appl. No.: 497,094

[22] Filed: May 23, 1983

[51] Int. Cl.³ .............................. F23Q 7/22; G12B 9/00; B25G 3/00; F16G 11/00
[52] U.S. Cl. ................................. 219/269; 29/455 R; 29/464; 29/526 R; 219/267; 219/265; 248/27.1; 248/323; 403/13
[58] Field of Search .................. 29/526 R, 455 R, 464; 339/82, 130; 219/260, 267, 264, 202; 248/354.3, 359, 27.1, 323, 333; 403/13

[56] References Cited

U.S. PATENT DOCUMENTS

| | | | |
|---|---|---|---|
| 2,180,711 | 11/1939 | Lehmann | 219/267 X |
| 2,419,950 | 5/1947 | Johnson | 219/269 |
| 3,200,366 | 8/1965 | Stuart | 248/27.1 X |
| 3,341,687 | 9/1967 | Horwitt et al. | 219/264 X |
| 3,955,333 | 5/1976 | Fellin | 403/13 |
| 3,975,619 | 8/1976 | Uda | 219/267 X |

Primary Examiner—Charlie T. Moon
Attorney, Agent, or Firm—Cynthia Berlow

[57] ABSTRACT

A two-piece metal clamping shell for electric cigar lighters of the type employed in automobiles and other vehicles wherein a socket is carried in an aperture of the vehicle dashboard or other panel and an igniting unit or plug is receivable in the socket. The clamping shell includes a cylindrical body member which encircles the cigar lighter socket and which is adapted to secure the latter in its operative position. The body member of the shell is disposed behind the dashboard, and retains the socket by its engagement with the rear surface of the dash. The socket has a threaded portion at its inner end, and a similarly threaded clamp ring is applied thereto with the said body member being disposed between it and the dashboard's rear surface. The clamp ring has a peripheral nest portion adapted to centralize the body member with respect to the socket, and is capable of being tightened on the socket so as to secure the latter in place. The invention is especially useful where small lamps are employed to illuminate the interior of the socket when the plug is removed. A keying arrangement on the rear surface of the dashboard and on the body member holds the latter against rotation, insuring the proper, desired orientation of the body member and lamp with openings in the socket whereby the latter does not block light from the lamp.

26 Claims, 22 Drawing Figures

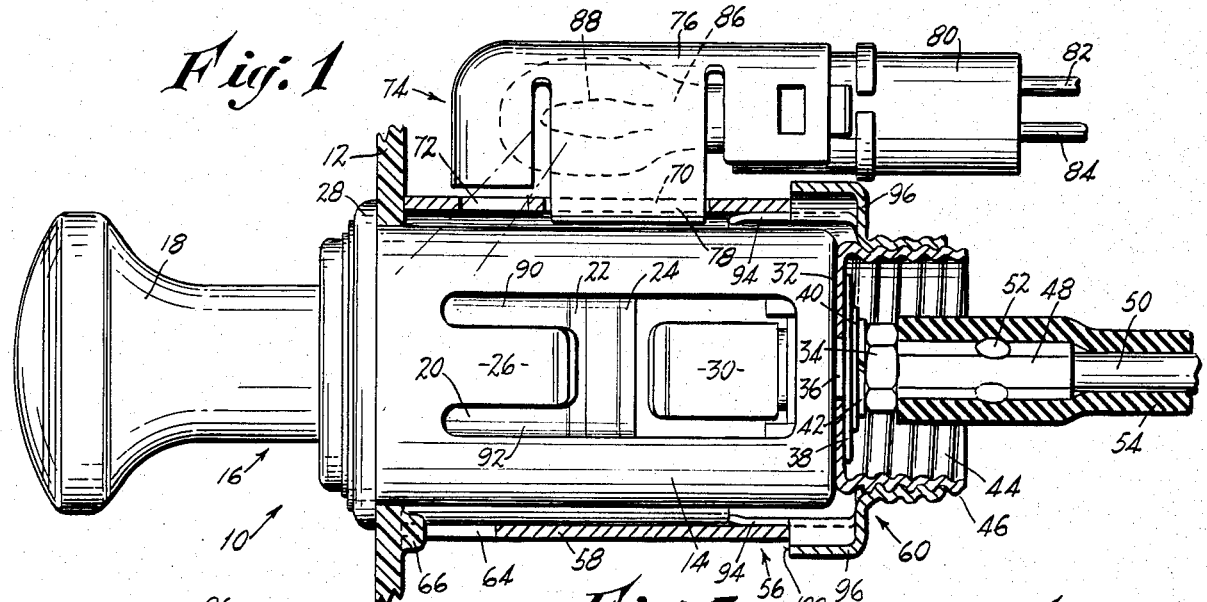

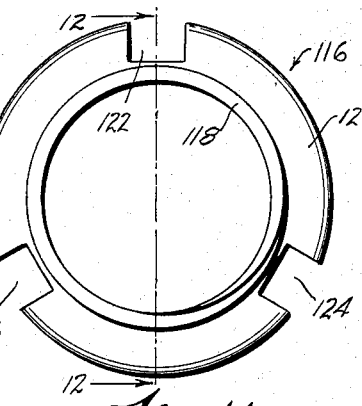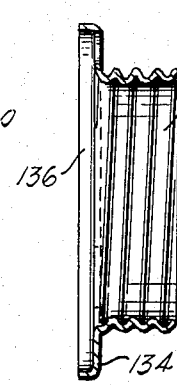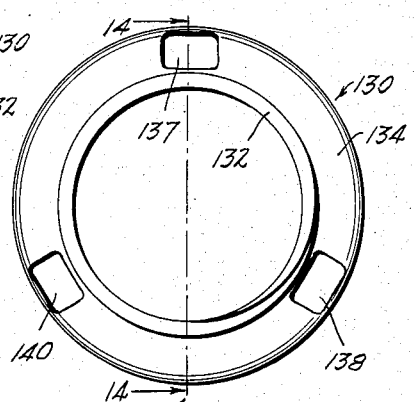
Fig.12　Fig.11　Fig.14　Fig.13
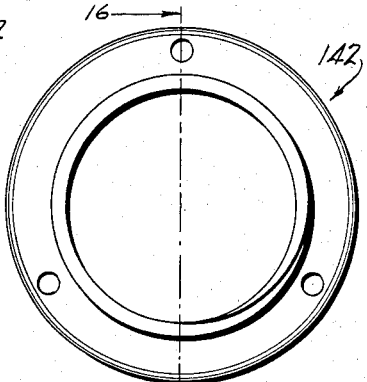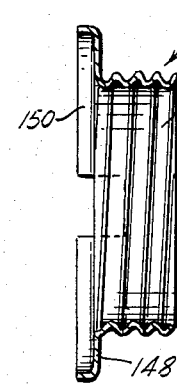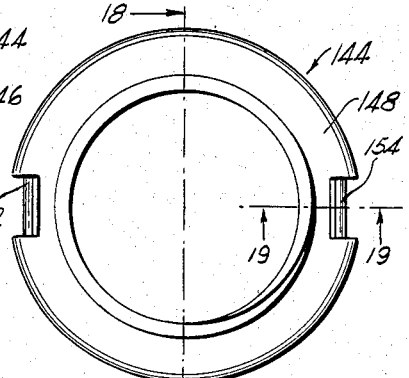
Fig.16　Fig.15　Fig.18　Fig.17
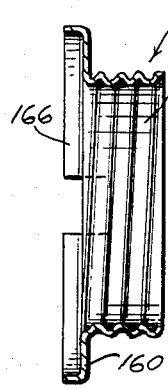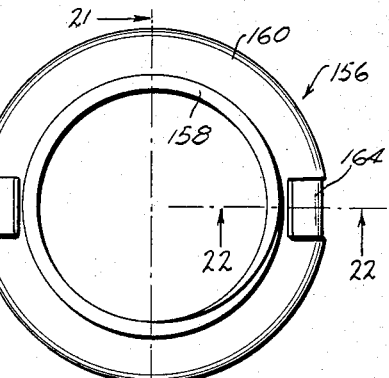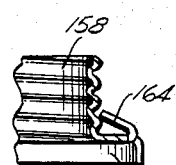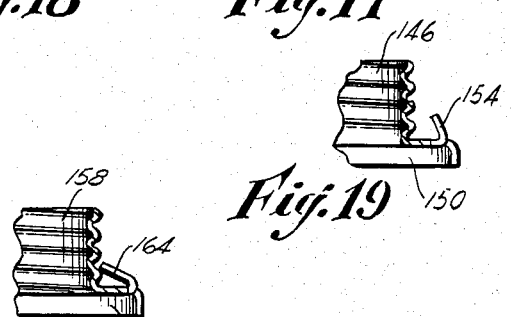
Fig.21　Fig.20　Fig.22　Fig.19

MULTI-PIECE CLAMPING SHELL FOR ELECTRIC CIGAR LIGHTERS

BACKGROUND OF THE INVENTION

This invention relates generally to electric cigar lighter devices, and more particularly to lighters of the type incorporated in automobiles or other vehicles wherein small lamp fixtures are associated with the lighters in order to provide illumination of the interior of the socket for facilitating replacement of the ignitor plug under conditions of darkness, etc.

In the past, a number of arrangements have been proposed and produced for providing illumination for the sockets of cigar lighter devices of the type noted above. Over the years, numerous refinements to the basic cigar lighter structure have been devised, both from the standpoint of improved reliability, and economy of manufacture and assembly. Typically, such units incorporate an ignitor plug removably carried in a bezel-provided cylindrical well or socket member which was adapted to be inserted in an aperture in the dashboard or other panel of the automobile. The socket member had a threaded portion at its inner end which was adapted to be secured to a cylindrical one-piece threaded clamping shell. The socket member was generally installed from the front, and the clamping shell screwed on from the rear, such that the front edge of the shell tightly engaged the rear surface of the dashboard.

With the advent of newer model automobiles, provision has frequently been made for illuminating the interior of the socket of the lighter, in order to facilitate the replacement of the ignitor plug under dark conditions. Such an improvement was considered desirable, since following use the plug was usually still fairly hot and difficulty could be experienced in locating the socket whereby there existed the possibility of personnel in the passenger compartment being inadvertently burned, clothing catching fire, etc.

In practically all prior arrangements, the bulb was disposed in a small sheet metal housing carrying a removable electrical fixture for the bulb. The bulb housing usually had small tabs which fitted into slots in the clamping shell, and one or more openings were provided in the latter adjacent the filament of the bulb, in order to admit light to the interior of the shell.

Most of the cigar lighter sockets produced in the past 10 years or so have included stamped out spring fingers and ventilating holes of one type or another, the spring fingers being associated with the replacement of the plug in the socket when the lighter was not being used. The ventilating holes prevented excessive heat from damaging the various parts of the lighter, particularly under conditions of prolonged use, and during hot weather, etc. Generally the lignt entering through the holes in the clamping shell could also pass through apertures in the socket wall if there was proper alignment or registration between them. However, such registration did not always occur, and the burden was placed on the installer to insure that the relative positions of the socket and its openings on the one hand, and the holes in the clamping shell on the other hand, were sufficiently aligned to permit adequate light from the lamp to impinge on the inner wall of the socket and thus provide the desired illumination. Such restrictions have caused problems in the past, since oftentimes, the position at which one-piece clamping shells reached the proper tightness with respect to their sockets did not result in proper alignment of the light-admitting holes. This necessitated repositioning of the socket in some circumstances, or re-installation of the various parts in order to reach a compromise between proper torque and the required registration between the openings in the socket wall and clamping shell.

SUMMARY

The above disadvantages and drawbacks of prior clamping shell arrangements for electric cigar lighters of the type indicated above are largely obviated by the present invention which has for one object the provision of a novel and improved clamping shell construction which enables alignment of registerable light openings to be readily effected at all times while also being extremely simple in its construction and providing ease of installation with a consequent reduction in the overall assembly time.

A related object of the invention is to provide an improved clamping shell as above set forth, which can be positively keyed with respect to the dashboard or other panel of the vehicle, to insure the proper installation of such shells as required where they incorporate auxiliary lamp fixtures to provide illumination to the interior of the socket.

A further object of the invention is to provide an improved clamping shell as above characterized, wherein the body member part of the shell can be keyed to the dashboard in a fixed, predetermined position, and wherein a special clamp ring part of the shell can be readily installed on the threaded end portion of the socket so as to tightly engage the opposite end of the member, all without disturbing the fixed position of the member with respect to the dash. Where the clamping shell carries a lamp fixture, the latter also remains in a fixed position with respect to the dash, thus facilitating adjustable rotation of the socket in order to bring an opening in the side wall thereof substantially in alignment with the filament of the lamp and maximize the lighting effect on the interior walls of the socket when the ignitor plug of the lighter is removed.

Still another object of the invention is to provide an improved clamping shell of the kind indicated, the parts of which can be readily formed as simple drawn sheet metal pieces, and the body member portion of which can have incorporated in its side wall the necessary apertures by which a lamp fixture can be affixed thereto in an operative position by means of spring fingers, thereby eliminating the need for welding or other forms of securement, etc.

Yet another object of the invention is to provide an improved two-piece clamping shell as above described, which can be readily installed with a minimum of effort and with little judgement being required on the part of the personnel performing the installation.

A still further object of the invention is to provide an improved clamping shell as outlined above, wherein unique threaded clamp ring parts are provided with novel centering structures that operate to closely align the axis of the socket with that of the clamping shell, whereby there are minimized or eliminated problems with binding or undesirable canting or tilting of the shell, or other possible complications involving poor or incorrect installation of the various parts of the cigar lighter. In addition, in many of the electric cigar lighter sockets currently in use, the area of the socket wall that is adjacent to the bimetal latching fingers is cut away, and an object of the present arrangement is to eliminate the possibility of the annular wall of the clamping shell inadvertently coming in contact with either of the fingers.

Yet a further object of the invention is to provide an improved clamping shell as above characterized, wherein a simple drawn sheet metal clamp ring can be employed in association with the body member portion of the shell, and merely screwed in place on a cooperable threaded end portion of the cigar lighter socket to provide the necessary retention therefor.

The above objects are accomplished by the provision of a two-piece metal clamping shell for use with the socket of an electric cigar lighter of the type adapted to be mounted in an apertured panel of an automobile or other vehicle, comprising a cylindrical body member adapted to encircle the socket of the lighter and having at one end a keying means for engagement with cooperable keying means at the rear of the apertured panel where the lighter is to be mounted, and wherein the body member has a window in its side wall with means for supporting an electric lamp to direct light through the window and into the interior of the member. An internally-threaded clamp ring is provided for securement to the threaded end portion of the cigar lighter socket after the socket has been inserted into the aperture of the dash from the front, with the body member of the clamping shell being interposed between the dashboard and the clamp ring. The ring has a peripheral nest portion which operates to center the end of the body member opposite that end which engages the dash, and which provides a driving engagement to the member so as to forcibly hold it against the dash when it is installed in its position encircling the socket. The ring also has means for engagement by a suitable tool, for loosening or tightening it, as during installation or removal of the device from the panel.

The above objects are further accomplished by the provision of a simplified two-piece metal clamping shell for an electric cigar lighter of the type having a socket with a threaded portion at its inner end, comprising a generally cylindrical body member which is adapted to encircle the socket at the rear of the dash and be secured in an operative position sandwiched between the dash and a clamp ring screwed onto the threaded end portion of the socket. Disposed at the front of the body member is a keying means which cooperates with keying means at the rear surface of the dash, so as to maintain the member in a fixed, predetermined position with respect to the dash once the shell is installed. The body member has a window in its side wall, together with mounting means adjacent the window to support an electric lamp for directing light from the latter inward through the window to the interior of the member. The socket has at least one opening in its side wall, and is turnably adjustable with respect to the panel and keyed body member, such that it is possible to easily orient the opening of the socket with the window of the member and thereafter tighten the clamp ring so as to secure the member and socket in such relative positions that the light from the lamp can pass through the opening in the socket wall and provide useful illumination to the interior of the socket. This is especially useful at night, since the illumination provides an indication to the driver or other passenger as to the exact location of the socket, and thus greatly facilitates re-installation of the ignitor plug following use. Accordingly, there is eliminated any problem of fumbling with the ignitor plug while it is still in its hot condition, thereby minimizing the possibility of burns being suffered by personnel in the passenger compartment, or hazards associated with possible igniting of clothing, or of the contents of the vehicle.

With the constructions that will be described below, very simple drawn sheet metal parts are employed, utilizing rolled thread formations or else a single turn helical thread constituted as an edge portion of a central aperture in the clamp ring. Unique centering guides are provided on the various clamp rings, to facilitate initial attachment of the clamp rings to the open end of the clamping shell body member, thus simplifying manufacturing procedures and making the overall assembly considerably easier than would be the case were such features omitted. It should be recalled that in some cases, performance of maintenance on such electric cigar lighter devices involves work underneath the dashboard, and with the advent of the newer model vehicles that incorporate a multitude of optional electrical accessories, very often it is difficult to obtain clearance or access to such locations, particularly those adjacent the rear of the dashboard. The same is true in cases involving door panels, as where one or more lighter devices are located in the arm rests of the vehicle doors. By the present arrangements, problems with installation and/or removal are significantly reduced.

Other features and advantages will hereinafter appear.

In the drawings, illustrating several embodiments of the invention:

FIG. 1 is a view, partly in side elevation and partly in axial section, of an electric cigar lighter particularly illustrating the ignitor plug thereof, the socket, the clamping shell carrying a lamp fixture, and the clamp ring of the clamping shell, disposed in the relative axial positions they would occupy when the unit is mounted in a conventional dashboard of an automobile or other vehicle; for simplicity of illustration, however, the socket of the cigar lighter is shown as rotated 90° out of its ultimate, operative position in order to reveal the light openings for illumination of its interior.

FIG. 2 is a front end elevation of the clamp ring of the clamping shell of FIG. 1.

FIG. 3 is a section taken on the line 3—3 of FIG. 2.

FIG. 4 is a rear end elevation of the clamp ring of FIGS. 1-3.

FIG. 5 is a rear end elevation of a somewhat modified clamp ring, incorporating a single helix internal thread in place of the multi-turn thread of the ring of FIGS. 1-4.

FIG. 6 is a section taken on the line 6—6 of FIG. 5.

FIG. 7 is a rear end elevation of the body member portion of the clamping shell of the cigar lighter of FIG. 1.

FIG. 8 is a bottom plan view of the body member portion of the clamping shell of FIGS. 1 and 7.

FIG. 9 is a side elevation of the body member portion of the clamping shell of FIGS. 1, 7 and 8, showing the surface which would face the viewer in FIG. 1 if the member were not sectioned.

FIG. 10 is a top plan view of the body member of the clamping shell of FIGS. 7-9, particularly illustrating two slots adapted to mount a housing for the lamp fixture of FIG. 1, and a circular hole constituting a window which is adapted to transmit light from the lamp fixture housing to the interior of the body member.

FIG. 11 is a rear elevation of a second modification of a clamp ring, adapted to be substituted for the ring of FIGS. 1-4, for use with a body member of somewhat greater length than that shown in FIGS. 1 and 7-10.

FIG. 12 is a vertical section of the modified clamp ring of FIG. 11, taken on the line 12—12 of FIG. 11.

FIG. 13 is a rear elevation of a third modification of a clamp ring which could be substituted for the ring of FIGS. 1-4, for use with a body member of somewhat greater length than that shown in FIGS. 1 and 7-10.

FIG. 14 is a vertical section of the modified clamp ring of FIG. 13, taken on the line 14—14 of FIG. 13.

FIG. 15 is a rear elevation of a fourth modification of a clamp ring which could be substituted for the ring of FIGS. 1-4, for use with a body member of somewhat greater length than that shown in FIGS. 1 and 7-10.

FIG. 16 is a vertical section of the modified clamp ring of FIG. 15, taken on the line 16—16 of FIG. 15.

FIG. 17 is a rear elevation of a fifth modification of a clamp ring which could be substituted for the ring of FIGS. 1-4, for use with a body member of somewhat greater length than that shown in FIGS. 1 and 7-10.

FIG. 18 is a vertical section of the modified clamp ring of FIG. 17, taken on the line 18—18 of FIG. 17.

FIG. 19 is a fragmentary section taken on the line 19—19 of FIG. 17.

FIG. 20 is a rear elevation of a sixth modification of a clamp ring which could be substituted for the ring of FIGS. 1-4, for use with a body member of somewhat greater length than that shown in FIGS. 1 and 7-10.

FIG. 21 is a vertical section of the modified clamp ring of FIG. 20, taken on the line 21—21 of FIG. 20.

FIG. 22 is a fragmentary section taken on the line 22—22 of FIG. 20.

Referring first to FIG. 1, there is illustrated an electric cigar lighter device 10 for an automobile or other conveyance which can have the usual mounting panel or dashboard 12 for carrying the cigar lighter well or socket 14. Removable in the well 14 is an ignitor plug 16 comprising a manually engageable knob 18, an ignitor plug body 20 of conventional construction having a first detent bead 22 which operates to maintain the plug in its fully inserted position in the socket as shown in the figure, and a second detent bead 24, which functions to effect advancement of an ashguard with respect to the heating element (not shown), all in the usual manner. The part of the ignitor plug body 20 which is visible in FIG. 1 is the ashguard.

As is usual, at diametrically opposite locations on the wall of the socket 14 there are lanced spring fingers 26, only one of which is illustrated in FIG. 1, for simplicity. The fingers are biased radially inwardly into engagement with the bead 22 when the lighter is in the storage position, thus preventing the ignitor plug 16 from inadvertently working out, as can be readily understood. Also, in use, as the plug 16 is withdrawn the fingers 26 engage the bead 24, tending to advance the ashguard with respect to the heating element and thus catch any ashes or cinders which might inadvertently drop off the element during igniting of a cigar or cigarette.

The socket 14 has the usual annular bezel or outturned flange 28 which engages the front surface of the dashboard 12 as shown, and disposed inside the socket are bimetallic spring fingers 30, also of conventional construction, which are intended to engage and momentarily grip, when the lighter is actuated, the side portions of the heating element cup (not shown) that is carried by the ignitor plug 16. The fingers 30 are insulated from the socket 14, and are electrically connected to a stud (not shown) which extends through a transverse wall 32 of the socket and which is secured by a nut 34. An insulating washer (not shown) is provided where the stud passes through the wall 32, and additional insulating washers 36, 38 are disposed adjacent this wall. A metal washer 40 and lockwasher 42 complete the assembly.

As illustrated, the inner end of the socket 14 carries a cup 44 having a rolled thread formation 46; the cup is electrically connected to and at substantially the same electrical potential as that of the remainder of the socket 14. The thread formation 46 is adapted to mate with a corresponding internal thread of a unique clamp ring to be described below.

External electrical connection to the bimetal fingers 30 is made by means of a releasable fastener 48 which carries an electrical lead 50 that is staked in place at 52. Insulation 54 covers the lead to prevent short-circuiting to other wiring in the vicinity of the socket 14.

In accordance with the present invention there is provided a novel and improved multi-part clamping shell 56 associated with the cigar lighter, by which there is facilitated the assembly thereof to the dashboard in a manner enabling light-openings to be quickly and accurately aligned for the purpose of socket illumination by an electric lamp. The clamping shell 56 comprises two separate pieces, a tubular body member 58 of generally cylindrical configuration, particularly illustrated in FIGS. 7-10, and a clamp ring 60 shown in FIGS. 2-4. The front end of the body member 58 is adapted to engage the rear surface of the dashboard 12 as shown in FIG. 1, and the other or back end is intended to be engaged by the clamp ring 60 when the latter is installed on the threaded portion or cup 44 of the cigar lighter socket 14.

As seen in FIGS. 7-10, the body member 58 has a series of longitudinally extending strengthening ribs 62, shown as being six in number in FIG. 7, and has at its front end a series of keying notches or cut-outs 64 which are intended to receive cooperable keying means on the rear surface of the dashboard 12, which are in the form of one or more projections 66. The arrangement is such that once the body member 58 is in position with a projection 66 occupying one of the cut-outs 64, turning of the body member 58 with respect to the dashboard is no longer possible, and accordingly when the clamp ring 60 is screwed onto the threaded cup 44 of the socket 14 and begins to engage the unnotched end or edge 68 of the body member 58, the latter will not turn.

Referring again to FIG. 10, it can be seen that the body member 58 has two slots 70 and one opening constituting a circular window 72 for admitting light from a lamp fixture 74 shown in FIG. 1. The fixture 74 comprises a sheet metal housing 76 having a semi-cylindrical configuration with two ears 78 that are adapted to be received in the slots 70. The ends of the ears 78 have reverse bends, and the material of the housing is somewhat resilient such that once the housing 76 is installed with the ears 78 occupying the slots 70, the resilience of the metal will retain the housing in the position shown in FIG. 1. One end of the housing is open as shown, and receives an electrical socket 80 having leads 82, 84 extending therefrom, and a having a bulb 86 with a filament 88 that can provide illumination to the interior of the body member 58 through the window 72.

Considering now FIG. 1, it is possible through proper alignment of the socket 14 with respect to the body member 58, to bring into registration the window 72 with one of the openings in the socket 14, such as the slots 90, 92 defined by the spring fingers 26. With this arrangement the interior of the socket 14 can be illuminated at all times that the plug 16 is removed, by the light emanating from the lamp filament 88. It has been found that sufficient light can pass through these openings to reflect off the interior surface of the annular walls of the socket 14, thereby to assist either the driver or else other passengers in the proper replacement of the igniting unit plug 16, following use. This feature involving illumination of the socket is considered to be highly desirable, since in the past, under dark conditions problems have been encountered in locating the socket and properly re-inserting the plug. Difficulties arose involving inadvertently burned fingers, burned clothing, dropped ashes or cinders, possible fires, etc.

Replacement of the bulb 86 involves merely a squeezing of the housing tabs 78 toward one another so as to free their ends from the slots 70, and removal of the housing 76, after which the old bulb can be readily pulled from the electrical socket 80, a new one installed, and the housing 76 replaced.

By the present invention the clamp ring 60 is provided with multiple fingers 94 disposed about its periphery and lying generally within the confines of a cylindrical surface, as best illustrated in FIG. 2. The diameter of this surface can be just slightly smaller than the inner diameter of the body member 58, such that the lugs 94 are telescopically received in the open end thereof as in FIG. 1, and the ring screwed in position on the cup 44 of the socket 14 until radially-extending lug formations 96 on the clamp ring engage the edge 68 of the body member. As shown in FIGS. 7-10, this edge is generally circular and is relatively smooth, that is, without shoulders or projections such that as the clamp ring is installed, it can readily slide against the edge as the ring is tightened, thereby minimizing any tendency for binding or seizing of the metals of which the parts are constituted. Also, by the present invention, as disclosed herein the fingers 94 have inwardly offset ends 98 which constitute a lead-in formation during installation of the clamp ring into the end of the body member 58, thereby facilitating its initial installation. The degree of offset is just sufficient to provide the necessary lead-in capability, but without causing interference or short-circuiting with the bimetal fingers 30 of the socket, as shown in FIG. 1.

Referring again to FIG. 2, it can be seen that the outer portions of the lug formations are of generally rectangular or squared configuration, and provide the necessary edge surfaces 100 for engagement with the edge 68 of the body member 58 when the ring is installed on the socket 14 (cup 44) of the lighter. It is noted that the outermost portions of these lugs 96 extend radially outward by an amount which exceeds the outer diameter of the body member 58, as best illustrated in FIG. 1, to insure proper seating of the edge of the body member 58 and ring 60. The ring 60 has a threaded barrel 102 that is received on the threaded portion of the cup 44 as in FIG. 1.

The present construction is seen to provide a desirable centralizing action of the body member 58 with respect to the socket 14 of the lighter by virtue of the provision of the fingers 94 on the clamp ring 60. The ring centralizes that end of the body member adjacent the rear of the socket, thus minimizing or eliminating possible problems of interference with the bimetal fingers 30, and tending to maintain the axes of the socket 14 and body member 58 aligned or coincidental, insuring that no tilting or canting of the body member occurs as the ring 60 is tightened. This is considered to be an important feature of the present invention, since any tendency for the body member to become misaligned during installation could adversely affect proper positioning of either the socket or the clamping shell, and at the least would make such installation more difficult to accomplish.

Another embodiment of the invention is illustrated in FIGS. 5 and 6 wherein there is shown a somewhat modified clamp ring 104 that could be substituted for the clamp ring 60 of FIGS. 1-4. In the modified construction, the threaded barrel 102 has been eliminated, and a single turn helical thread 106 provided, extending through an angle of roughly 360°. As in the previous case, the clamp ring 104 is provided with longitudinally extending fingers 108 having offset end portions 110 constituting leadin formations, as well as multiple lugs 112 having edges 114 which are adapted to engage the corresponding edge of the inner portion of the body member of the clamping shell. This construction is seen to have the same advantages as those of the firstmentioned embodiment, as concerns proper centralization of the body member when the clamp ring 104 is screwed onto the threaded end portion or cup 44 of the socket. In some respects, the embodiment of FIGS. 5 and 6 may be especially well adapted for certain installations, since the cost of the part is likely to be somewhat less than that of the first described component, due to the elimination of a thread-rolling procedure that is involved with producing the threaded barrel 102 shown in FIG. 3. In other respects, the construction of FIGS. 5 and 6 is similar to that of the first mentioned ring construction, with the exception that the body member which would be required would have a slightly increased length over that shown in FIGS. 1 and 7-10, and labelled 58.

Yet another embodiment of the invention is illustrated in FIGS. 11 and 12, showing a somewhat simplified clamp ring arrangement generally designated 116. The ring has a threaded barrel 118 and a peripheral flange 120 extending in a plane which is generally perpendicular to the axis of the barrel 118.

By the present invention the flange 120 is provided with a series of cut-outs 122, 124 and 126 shown as being three in number, although other configurations could be employed as well. The periphery of the flange 120 has an upturned lip 128 which, together with the flange 120 provides a centralizing seat for the edge of a body member (not shown) that would be of a construction similar to that illustrated in FIGS. 7-10. In use, the edge of the body member would be seated inside the lip 128 as the clamp ring 116 is tightened on the socket, such tightening being accomplished by a suitable tool (not shown) having projections that are receivable in the cut-outs of the flange 120. The advantages noted above, namely those involving proper centralization of the body member (similar to the part 58 of FIG. 1) as the ring is tightened, are retained in the present arrangement. In addition, it can be seen that this particular construction is extremely simple in its structure, and may be preferred for certain installations, especially if there is adequate access to the area where the lighter is to be installed.

Yet a further embodiment of the invention is shown in FIGS. 13 and 14, wherein a still different clamp ring is provided, designated 130. This construction is somewhat similar to that of FIGS. 11 and 12, comprising a threaded barrel 132, peripheral flange 134 having an upturned edge 136, and wherein the flange is provided with a series of apertures 137, 138 and 140 suitable for receiving the projections (not shown) of a suitable installation tool. This arrangement has the advantage of elimination of the sharp edges associated with the cutouts of the previous construction, and may be preferred for certain applications.

Still another embodiment of the invention is shown in FIGS. 15 and 16, providing a construction 142 somewhat similar to that of the previous embodiment with the exception that the apertures corresponding to those labelled 137, 138 and 140 are circular instead of being rectangular as in FIG. 13.

FIGS. 17–19 show a further modified construction for a clamp ring, the ring being designated 144, having a threaded barrel 146, flange 148 with upturned edge 150, and two oppositely-disposed punched-out lug formations 152, 154 one of which is particularly shown in FIG. 19. The lugs 152, 154 can be formed directly from the material of the flange 148, and bent back at an angle as shown. During installation, a suitable tool having oppositely located shoulders or lug-receiving apertures can be applied over the ring in order to effect installation.

A further modification is shown in FIGS. 20–22 which is somewhat similar to the configuration of the previous construction, except that during initial formation of the ring, additional length is provided for the lugs such that they can be bent back to the position shown in FIG. 22, to a point where they engage the threaded barrel and thus realize improved strength and stiffness, minimizing any tendency for deformation to occur, such as from improper handling or overtightening, etc. In the embodiment of FIGS. 20–22, the ring is indicated by the numeral 156, comprising a threaded barrel 158, flange 160, and lugs 162, 164. The periphery of the flange is turned up, as at 166, so as to provide proper seating for the circular edge of the body member of the clamp shell, i.e. a part similar to that labelled 58 in FIG. 1. With this construction, the likelihood of the lugs 162, 164 being inadvertently damaged due to overtightening, is minimized by virtue of the engagement of their ends with the barrel 158. Improved rigidity and strength are thus realized.

The present invention also embraces the novel method of installing, into the aperture of an automobile panel 12, an electric cigar lighter 10 of the type having a socket 14 with a threaded portion 44 at its inner end, a bezel 28 at its outer end adapted to engage the front surface of the panel 12, a separate and distinct clamping shell 56, having a tubular body member 58 adapted to surround the socket 14 and carry an illuminating fixture 76 having an electric lamp 86 for lighting the interior of the cigar lighter socket when the ignitor plug 16 is removed, the body member 58 having mounting means 70, for the illuminating fixture, and having a window 72 through which light from the electric lamp can pass so as to illuminate the interior of the clamping shell, the clamping shell 56 further comprising a clamp ring 60 having a thread formation 102 adapted to mate with the threaded portion 44 of the cigar lighter socket, said socket having an annular wall and at least one aperture 90, 92 in its wall, the method comprising the steps of inserting the socket 14 into the aperture of the panel 12, placing the body member 58 of the clamping shell 56 over the portion of the socket 14 that is protruding from the rear of the panel 12, rotating the socket so as to bring the aperture 90, 92 in the annular wall thereof into registration with the window 72 of the body member of the clamping shell such that light can pass from the lamp 86 through the window 72, and thereafter through the aperture in the socket wall so as to provide illumination to the interior of the socket, restraining the socket and body member against rotation while the clamp ring 60 of the clamping shell is screwed onto the threaded end of the socket, and tightening the ring so as to secure the parts 14, 58 in position, with the window 72 and aperture 90, 92 of the socket still in registration with one another. The method further comprises the step of keying the body member 58 of the clamping shell 56 to the rear surface of the apertured panel or dashboard 12, so as to prevent rotary movement thereof while the clamp ring 60 is being installed onto the threaded end 44 of the socket.

From the above it can be seen that we have provided novel and improved clamping shell arrangements and a method of installation for electric cigar lighters, the devices and processes being both simple and involving ease of installation and maintenance should this be necessary at a later time. The provision of the separate clamp ring which is applied to the socket itself, and which necessitates no re-positioning of the body member of the clamping shell during installation effectively solves the problem of attaining proper alignment or registration of the window in the clamping shell with respect to one or more of the openings in the annular wall of the socket. During installation, the clamping shell body member, being keyed to the rear of the dashboard, cannot rotate. Accordingly, the factory assembler merely turns the socket of the cigar lighter such that one of the openings in the annular wall thereof registers with the window in the clamping shell body member, and then, while holding the socket in a fixed position, merely tightens the clamp ring onto the threaded end of the socket. It will be understood that initial engagement of the threads of the ring with those of the socket can be done with the fingers of one hand, while the other hand holds the socket in position from the front of the dashboard. Final tightening can be accomplished by means of suitable wrenches or tools. With the embodiments of FIGS. 11–22, such tools would in all likelihood be made up especially for the intended configuration. It will be understood, however, that these fixtures or tools could have a simple structure, and could be readily produced very inexpensively, with a minimum of time and effort.

The devices are thus seen to represent a distinct advance and improvement in the technology of electric cigar lighters.

Each and every one of the appended claims defines an aspect of the invention that is distinct from all others, and accordingly each claim is to be treated in this manner when examined in the light of the prior art in any determination of novelty or validity.

Variations and modifications are possible without departing from the spirit of the invention.

What is claimed is:

1. A two-piece metal clamping shell for use with threaded sockets of an electric cigar lighter of the type placed in any of a number of different rotative positions in an apertured panel of an automobile or other conveyance, comprising in combination:

(a) a cylindrical body member adapted to encircle such socket, said body member having at one end a keying means for engagement with cooperable keying means at the rear of the apertured panel on which the cigar lighter socket is to be mounted, (b) said body member having a window in its side wall and having mounting means adjacent the window to support a lamp for directing light therefrom inward through the window to the interior of the body member, and (c) a clamp ring separate from and rotatable with respect to said body member, said ring having an internal thread by which it can be screwed onto a threaded end portion of the cigar lighter socket after the latter has been inserted into the panel aperture, (d) said clamp ring having an outer peripheral nest portion adapted for centered engagement with the other end of the body member while being rotatable with respect thereto, to axially shift and forcibly hold the latter against the rear of the panel when the body member is encircling said socket, (e) said clamp ring having means engageable by a suitable tool to enable it to be forcibly turned and tightened.

2. The invention as defined in claim 1, wherein:
(a) said internal thread comprises a single helix on the clamp ring, extending through an angle on the order of 360°.

3. The invention as defined in claim 1, wherein:
(a) said clamp ring is constituted as a drawn metal shell.

4. The invention as defined in claim 1, wherein:
(a) said clamp ring has multiple fingers disposed about its periphery and lying generally within the confines of a cylindrical surface, said fingers comprising said nest portion and being adapted for insertion inside the said other end of the body member so as to centralize the ring with respect thereto.

5. The invention as defined in claim 4, wherein:
(a) said fingers are closely confined by and closely engage the inner surface of the body member.

6. The invention as defined in claim 4, wherein:
(a) said fingers have radially-inwardly-offset lead-in formations at their inner extremities, so as to facilitate their insertion into the said other end of the body member during assembly.

7. The invention as defined in claim 4, wherein:
(a) said clamp ring has multiple, outwardly extending lug formations at its periphery,
(b) the outermost portions of said lug formations extending past a cylindrical surface which exceeds the diameter of the body member such that the end of the latter can be engaged by said lugs when the clamp ring is tightened onto the threaded portion of the socket.

8. The invention as defined in claim 7, wherein:
(a) the outer portions of the lug formations have generally square configurations, to facilitate their engagement by a suitable tool, during assembly.

9. The invention as defined in claim 1, wherein:
(a) said cooperable keying means comprises a projection on the rear surface of the apertured panel, and
(b) means providing a slot in the end surface of the body member that is adjacent to said panel,
(c) the dimensions of the projection and slot being such that the projection can be inserted into the slot to prevent turning of the body member with respect to the panel once the member is in position at the rear of the panel.

10. The invention as defined in claim 9, wherein:
(a) said cooperable keying means comprises means providing a plurality of slots in the end surface of the body member, so as to enable it to assume any one of a plurality of different fixed, predetermined positions with respect to the panel.

11. The invention as defined in claim 1, wherein:
(a) the said other end of the body member has a generally smooth, circular edge which facilitates the installation and tightening of the clamp ring, said circular edge presenting a non-binding sliding surface over which portions of the ring can ride during tightening of the ring on the threaded portion of the socket.

12. The invention as defined in claim 1, wherein:
(a) said body member has a plurality of circumferentiallyspaced longitudinal stiffening ribs extending for a substantial portion of its length.

13. The invention as defined in claim 1, wherein:
(a) said clamp ring has a central barrel portion, and an integral peripheral annular end portion comprising said nest portion,
(b) said peripheral end portion being provided with an upturned flange constituting a seat for the edge of the said other end of the body member.

14. The invention as defined in claim 13, wherein:
(a) said peripheral end portion has multiple cut-outs defining tool-engageable shoulders for effecting turning movement of the clamp ring during installation or removal of the ring.

15. The invention as defined in claim 13, wherein:
(a) said peripheral end portion has multiple apertures defining tool-engageable shoulders for effecting turning movement of the clamp ring during installation or removal of the ring.

16. The invention as defined in claim 15, wherein:
(a) said apertures are of generally circular configuration.

17. The invention as defined in claim 15, wherein:
(a) said apertures have a generally rectangular configuration.

18. The invention as defined in claim 13, wherein:
(a) said peripheral end portion has multiple lugs struck out therefrom, constituting tool-engageable shoulders for effecting turning movement of the clamp ring, during installation or removal of the ring.

19. The invention as defined in claim 13, wherein:
(a) said peripheral end portion has multiple lugs formed therein,
(b) said lugs being folded back toward the axis of the ring so as to constitute stiff shoulders for engagement by a suitable tool during installation or removal of the ring.

20. The invention as defined in claim 19, wherein:
(a) said folded-back lugs terminate at points which are closely adjacent to the barrel portion of the clamp ring.

21. A two-piece metal clamping shell for a socket-presenting electric cigar lighter intended for use in an automobile or other conveyance of the type having an apertured panel in which the lighter is to be mounted, comprising in combination:
(a) a cigar-lighter socket having a threaded end portion, (b) a generally cylindrical clamping body member adapted to encircle the socket, of the lighter, said body member having at one end a keying means for engagement with cooperable keying means at the rear of the apertured panel so as to enable the body member to be keyed to a predetermined, fixed position with respect to the panel, (c) said body member having a window in its side wall and having mounting means adjacent the window to support a lamp for directing light therefrom inward through the window to the interior of the body member, (d) said socket having at least one opening in its side wall and being turnably adjustable with respect to the said panel and keyed body member, and (e) a clamp ring having an internal thread by which it can be screwed onto the threaded end portion of the socket after the latter has been inserted into the panel aperture and rotated to a position wherein the opening of the socket is disposed adjacent the location of the window of the clamping shell, (f) said clamp ring having a peripheral nest portion adapted for centering driving engagement with the other end of the body member to forcibly hold the member against the rear of the panel while it is encircling said socket, (g) said clamp ring having means engageable by a suitable tool to enable it to be forcibly threadably tightened onto the clamping shell while the latter remains keyed in its predetermined, fixed position with respect to the panel, thereby permitting light from the lamp to pass first through the window of the shell and thereafter through the opening in the socket wall so as to provide illumination to the interior of the socket when the lighter plug is removed.

22. A two-piece metal clamping shell for a socket-presenting electric cigar lighter having an ignitor plug with a heating element cup intended for use in an automobilne or other conveyance of the type having an apertured panel in which the lighter is to be mounted, comprising in combination:

(a) a cigar-lighter socket having a threaded end portion, (b) a generally cylindrical body member adapted to encircle the socket of the lighter, said body member having at one end a keying means for engagement with comperable keying means at the rear of the apertured panel so as to enable the body member to be keyed to a predetermined, fixed position with respect to the panel, and (c) a clamp ring having an internal thread by which it can be screwed onto the threaded end portion of the socket after the latter has been inserted into the panel aperture, (d) said clamp ring having a peripheral nest portion adapted for centering the body member with respect to the adjacent end of the cigar lighter socket whereby the socket axis is generally coincidental with the axis of the body member, said nest portion effecting driving engagement with rhe other end of the body member to forcibly hold the member against the rear of the panel while it is encircling said socket.

(e) said clamp ring having means engageable by a suitable tool to enable it to be forcibly threadably tightened onto the clamping shell while the latter remains keyed in its predetermined, fixed position with respect to the panel.

23. The invention as defined in claim 22, wherein:

(a) said socket has bimetallic latching fingers adjacent its inner end, adapted to engage and latch over the heating element cup of the ignitor plug of the cigar lighter when the latter is depressed, (b) said body member and socket of the cigar lighter, when assembled, forming a clearance space of sufficient cross section as to minimize the possibility of interference or short-circuiting of the bimetallic fingers of the socket against the walls of the body member.

24. A two-piece metal clamping shell for a socket-presenting electric cigar lighter intended for use in an automobile or other conveyance of the type having an apertured panel in which the lighter is to be mounted, comprising in combination:

(a) a cigar-lighter socket having a threaded end portion, (b) a generally cylindrical body member, said body member having at one end a keying means for engagement with cooperable keying means at the rear of the apertured panel so as to enable the body member to be keyed to a predetermined fixed position with respect to the panel and adapted to encircle the socket of the lighter, (c) a clamp ring separate and distinct from the body member, having a centralizing means cooperable with that end portion of the body member which is remote from the panel, for maintaining substantial alignment of the axis of the socket with that of the body member, and for maintaining centralized the portion of the cigar lighter socket adjacent its threaded portion with respect to the adjacent end of the body member, so as to maintain an annular space between the socket member and the body member, and reduce the likelihood of undesirable tilting of one part with respect to the other during installation, (d) said clamp ring having an internal thread for threaded engagement with the threaded end portion of the socket and means engageable by a suitable tool to enable it to be forcibly threadably tightened against the body member so as to firmly seat the opposite end portion of the latter against the rear surface of the panel and thus secure the socket in operative position.

25. The invention as defined in claim 24, wherein:

(a) said centralizing means on the clamp ring comprises a plurality of longitudinally extending fingers disposed in a circular configuration about the periphery of the ring, and the diameter of the circle being such as to enable the fingers to be telescopically received within the body member and closely confined by the inner surface thereof 26. The invention as defined in claim 24, wherein:

(a) said centralizing means on the clamp ring comprises a peripheral cup-like flange having an edge portion of a dimension exceeding the outside diameter of the body member, (b) the edge of the body member being receivable in said cup-like flange, and the latter constituting a centralizing seat therefor.

* * * * *